US 12,186,809 B2
Jan. 7, 2025

(12) United States Patent
Pillai et al.

(54) HIGH TEMPERATURE ALLOYS

(71) Applicant: UT-Battelle, LLC, Oak Ridge, TN (US)

(72) Inventors: Rishi R. Pillai, Knoxville, TN (US);
Soumya Nag, Farragut, TN (US);
Thomas Feldhausen, Knoxville, TN (US)

(73) Assignee: UT-BATTELLE, LLC, Oak Ridge, TN (US)

(*) Notice: Subject to any disclaimer, the term of this patent is extended or adjusted under 35 U.S.C. 154(b) by 0 days.

(21) Appl. No.: 18/405,157

(22) Filed: Jan. 5, 2024

(65) Prior Publication Data

US 2024/0227006 A1    Jul. 11, 2024

Related U.S. Application Data

(60) Provisional application No. 63/437,229, filed on Jan. 5, 2023.

(51) Int. Cl.
| | |
|---|---|
| B22F 10/28 | (2021.01) |
| B22F 7/02 | (2006.01) |
| B22F 10/00 | (2021.01) |
| B22F 10/25 | (2021.01) |
| B32B 5/14 | (2006.01) |
| B32B 15/01 | (2006.01) |
| B32B 15/04 | (2006.01) |
| B33Y 10/00 | (2015.01) |
| B33Y 70/00 | (2020.01) |
| B33Y 80/00 | (2015.01) |
| C22C 1/04 | (2023.01) |

(Continued)

(52) U.S. Cl.
CPC ............. *B22F 7/02* (2013.01); *B22F 10/25* (2021.01); *B22F 10/28* (2021.01); *B32B 5/145* (2013.01); *B32B 15/01* (2013.01); *B32B 15/015* (2013.01); *B32B 15/04* (2013.01); *B32B 15/043* (2013.01); *B33Y 10/00* (2014.12); *B33Y 70/00* (2014.12); *B33Y 80/00* (2014.12); *C22C 1/0433* (2013.01); *C22C 19/05* (2013.01); *C22C 19/051* (2013.01); *C22C 19/053* (2013.01); *C22C 19/055* (2013.01); *C22C 19/056* (2013.01); *C22C 19/057* (2013.01); *C22C 19/058* (2013.01); *C22C 30/00* (2013.01); *C22C 30/02* (2013.01); *C22C 38/08* (2013.01); *C22C 38/10* (2013.01); *C22C 38/105* (2013.01); *C22C 38/40* (2013.01); *C22C 38/44* (2013.01); *C22C 38/46* (2013.01); *C22C 38/48* (2013.01); *C22C 38/50* (2013.01); *C22C 38/52* (2013.01); *C22C 38/58* (2013.01); *B22F 2998/10* (2013.01); *B22F 2999/00* (2013.01); *Y10T 428/12458* (2015.01); *Y10T 428/12931* (2015.01); *Y10T 428/12937* (2015.01); *Y10T 428/12944* (2015.01); *Y10T 428/12965* (2015.01); *Y10T 428/12972* (2015.01); *Y10T 428/12979* (2015.01); *Y10T 428/12993* (2015.01); *Y10T 428/2495* (2015.01); *Y10T 428/24967* (2015.01)

(58) Field of Classification Search
CPC .... B22F 2999/00; B22F 2998/10; B22F 7/02; B22F 10/25; B22F 10/28; B33Y 10/00; B33Y 70/00; B33Y 80/00; C22C 1/0433; C22C 19/05; C22C 19/056; C22C 19/057; C22C 19/058; C22C 19/051; C22C 19/053; C22C 19/055; C22C 38/08; C22C 38/10; C22C 38/105; C22C 38/40; C22C 38/44; C22C 38/46; C22C 38/48; C22C 38/50; C22C 38/52; C22C 38/58; C22C 30/00; C22C 30/02; B32B 15/01; B32B 15/015; B32B 15/04; B32B 15/043; B32B 5/145; Y10T 428/12458; Y10T 428/12937; Y10T 428/12944; Y10T 428/12965; Y10T 428/12972; Y10T 428/12979; Y10T 428/12993; Y10T 428/12931; Y10T 428/24967; Y10T 428/2495

See application file for complete search history.

(56) References Cited

U.S. PATENT DOCUMENTS

| | | |
|---|---|---|
| 5,242,563 A | 9/1993 | Stern et al. |
| 2002/0002794 A1* | 1/2002 | Figueroa ............ B01J 19/2485 48/197 R |
| 2008/0166258 A1 | 7/2008 | Tanimoto et al. |
| 2012/0237429 A1 | 9/2012 | Netsu et al. |
| 2014/0271338 A1 | 9/2014 | Holcomb et al. |

FOREIGN PATENT DOCUMENTS

WO     2021/248755 A1    12/2021

OTHER PUBLICATIONS

DebRoy et al.: "Additive manufacturing of metallic components—Process, structure and properties", Progress in Materials Science 92 (2018) 112-224.

(Continued)

Primary Examiner — Michael E. La Villa
(74) Attorney, Agent, or Firm — FOX ROTHSCHILD LLP

(57) ABSTRACT

A compositionally graded alloy construction for separating a low oxygen content corrosive environment from a high oxygen content oxidizing environment includes a wall having a wall thickness and a first surface segment for contacting the low oxygen content corrosive environment, and a second surface segment for contacting the high oxygen content oxidizing environment. The alloy comprises, in weight percent: 0 to 5 Al; 5 to 30 Cr; 0 to 20 Co; 0 to 70 Fe; 0 to 2 Nb; 0 to 2 Ta; 0 to 3 Ti; 0 to 1 Si; 0 to 1 V; 0 to 2 Mn; 0 to 5 Cu; 0 to 30 Mo; 0 to 30 W; 0 to 0.1 P; 0 to 1 Zr; 0 to 1 Hf; 0 to 0.1 Y; 0.05 to 0.5 C; 0 to 0.1 N; and balance Ni.

11 Claims, 8 Drawing Sheets

(51) Int. Cl.
*C22C 19/05* (2006.01)
*C22C 30/00* (2006.01)
*C22C 30/02* (2006.01)
*C22C 38/08* (2006.01)
*C22C 38/10* (2006.01)
*C22C 38/40* (2006.01)
*C22C 38/44* (2006.01)
*C22C 38/46* (2006.01)
*C22C 38/48* (2006.01)
*C22C 38/50* (2006.01)
*C22C 38/52* (2006.01)
*C22C 38/58* (2006.01)

(56) References Cited

OTHER PUBLICATIONS

Zhang et al.: "Additive manufacturing of functionally graded materials: A review", Materials Science & Engineering A 764 (2019) 138209.
Ansari et al.: "An empirical-statistical model for coaxial laser cladding of NiCrAlY powder on Inconel 738 superalloy", Optics & Laser Technology 86(2016) 136-144.
International Search Report mailed on Apr. 2, 2024 in PCT/US2024/010470.

* cited by examiner

HIGH TEMPERATURE ALLOYS

CROSS-REFERENCE TO RELATED APPLICATIONS

This application claims priority to U.S. 63/437,229 filed on Jan. 5, 2023, entitled "HIGH TEMPERATURE ALLOYS AND METHODS FOR FABRICATING SAME", the entire disclosure of which incorporated herein by reference.

STATEMENT REGARDING FEDERALLY SPONSORED RESEARCH AND DEVELOPMENT

This invention was made with government support under Contract No. DE-AC05-00OR22725 awarded by the United States Department of Energy. The government has certain rights in this invention.

FIELD OF THE INVENTION

The present invention relates generally to high temperature alloys, and more particularly to high temperature alloys and articles therefrom for use in molten salt reactors.

BACKGROUND OF THE INVENTION

Sequential materials design approaches strive to achieve individual physical properties but fail to anticipate the consequences of complex interactions between underlying phenomena, such as environmental degradation and thermo-mechanical stability, that can substantially impact efficiency, performance and lifecycle requirements. Coupled extremes of high temperatures and corrosive environments as can be found in molten salt reactors drive compositional changes in the materials that further lead to detrimental subsurface dissolution of strengthening phases or formation of deleterious precipitates. The need to concurrently balance various design criteria such as mechanical properties, environmental resistance, and cost remains a critical barrier in the development of high temperature alloys. Generally, the optimization of one of these criteria results in a deficit in the others. For example, the addition of Cr is established to be beneficial for improving the mechanical properties (solid solution strengthening) and oxidation resistance (by forming an external protective chromia layer) of high temperature Fe- and Ni-base alloys. However, high Cr containing alloys are known to be susceptible to corrosion in molten salt environments due to the thermodynamically favored dissolution of Cr through the formation of Cr-halides The Ni-base alloy UNS #N1003 developed at the Oak Ridge National Laboratory (ORNL) as INOR-8 demonstrated excellent compatibility with molten fluoride salts (LiF, $BeF_2$, $ThF_4$, $UF_4$). However, the rapid deterioration in the creep rupture strength of UNS #N1003 above 700° C. will likely limit its application in heat exchangers at higher operating temperatures (>750° C.). The Ni-base precipitation strengthened alloy UNS #N07208 was deemed to be a suitable candidate material for supercritical $CO_2$ ($sCO_2$) applications due to its excellent mechanical properties, weldability, and oxidation resistance up to 800° C. However, the corrosion resistance in halide salts (chloride and fluoride) environments has received limited attention but is expected to be a limiting factor due to the high Cr content of UNS #N07208, 17~19 wt %. The measured compositions of UNS #N1003 and UNS #N07208 in their wrought form are given in Table 1.

TABLE 1

| Alloy chemical compositions (wt. %) determined by plasma and combustion analyses. | | | | | | | |
|---|---|---|---|---|---|---|---|
| Alloy | Ni | Cr | Fe | Co | Mo | Ti | Al Other |
| HN: UNS# N1003 | 71.9 | 7.2 | 3.7 | 0.6 | 16.0 | — | — Mn 0.3 Si 0.3 C 0.05 |
| 282 UNS# N07208 | 57.7 | 19.4 | 0.2 | 10.5 | 8.3 | 2.1 | 1.6 C 0.06 |

Metallic coatings are commonly employed to enhance the oxidation and corrosion resistance of the underlying high temperature materials. However, the inherent chemical incompatibility between the coatings and the substrate materials drives interdiffusion processes during service which in turn result in i) critical depletion of key alloying constituents (e.g., Cr, Al) from the coating, ii) microstructural changes impairing the load bearing capacity of the substrate material (e.g., by coarsening of γ'-phase in the superalloy), (iii) formation of Kirkendall porosity at the coating-substrate interface, (iv) precipitation of topologically close-packed (TCP) phases, and/or (v) precipitation of brittle Cr-rich carbides at the coating substrate interface. The detrimental effect of oxidation and interdiffusion on the chemical lifetime and alloy microstructure can be aggravated if the metal loss due to corrosion is accelerated by repeating oxide spallation as a result of thermal cycling. The aforementioned degradation processes can lead to subsequent failure of the coatings. More importantly, coating complex geometries such as inside of tubes or narrow channels in heat exchangers continues to be a fabrication challenge.

The opportunities and challenges become even more compelling when a structural material is required to withstand two simultaneous, but significantly differing, environmental attacks. A relevant example is an advanced molten salt reactor (MSR) heat exchanger thin wall section, with molten salt attack on one side of the wall and high temperature oxidizing working fluid (e.g., water, supercritical $CO_2$) on the opposing side of the wall. A paradigm shift in these traditional approaches is critically essential to enable the design of unified and stable gradient microstructures that deliver superior multi-target functionalities by maintaining structural integrity, while also reducing temporal uncertainties driven by diverse chemical incompatibilities at multiple interfaces or surfaces.

Recent developments in employing blown-powder directed energy deposition (DED) to manufacture functionally graded materials with material compositions between two terminal chemistries offer a plethora of opportunities in the pursuit of achieving this goal. Such functionally graded materials (FGMs) containing a spatial variation in composition and thus the microstructure is quite commonly employed for the specific purpose of controlling variations in thermal, electromagnetic, structural or functional properties. This is a significant advantage over conventional manufacturing techniques that require bulk casting and post processing of a single alloy composition, which may be a compromise in terms of cost and/or performance. However, numerous factors in DED, such as rapid solidification and steep thermal gradients, and a mismatch in compositionally graded material properties, such as melting temperatures and thermal expansion coefficients, combined with the need for varying processing windows and preventing formation of detrimental (brittle) phases significantly complicate the construction of graded materials. Three key challenges are generally associated with functionally graded materials, including those manufactured via DED: chemical incompatibility at interfaces, thermodynamic modeling and process control to fabricate defects, and distortion-free builds.

SUMMARY OF THE INVENTION

A wall construction is provided for separating a low oxygen content corrosive environment from a high oxygen content oxidizing environment. The wall has a wall thickness and a first surface segment for contacting the low oxygen content corrosive environment, and a second surface segment for contacting the high oxygen content oxidizing environment.

The wall comprises an alloy comprising, consisting essentially of, or consisting of, in weight percent: 0 to 5 Al; 5 to 30 Cr; 0 to 20 Co; 0 to 70 Fe; 0 to 2 Nb; 0 to 2 Ta; 0 to 3 Ti; 0 to 1 Si; 0 to 1 V; 0 to 2 Mn; 0 to 5 Cu; 0 to 30 Mo; 0 to 30 W; 0 to 0.1 P; 0 to 1 Zr; 0 to 1 Hf; 0 to 0.1 Y; 0.05 to 0.5 C; 0 to 0.1 N; and balance Ni. The alloy is compositionally graded from the first surface segment to the second surface segment. The composition of the alloy at the first surface segment comprises, consists essentially of, or consists of, in weight percent based on the total weight of the alloy at the first surface segment, 5-15 Cr, 0-70 Fe, 0-5 Co, 0-30 Mo, 0-1 Mn, 0-0.5 Si, 0-0.1 C, balance Ni. The composition of the alloy at the second surface segment comprises, consists essentially of, or consists of, in weight percent based on the total weight of the alloy at the second surface segment, 15-30 Cr, 0-70 Fe, 0-20 Co, 0-30 Mo, 0-3 Ti, 0-5 Al, and 0-0.5 C, balance Ni.

The alloy has a stable FCC austenitic matrix microstructure, with strengthening phases comprising gamma prime with a volume fraction of 0 to 30% and carbides with a volume fraction of 0 to 5%, based on the total volume of the alloy. The wall provides corrosion resistance to the liquid low oxygen content corrosive environment with O content between 0 to 20,000 ppm and to the high oxygen content oxidizing environment with O partial pressure between $10^{-20}$ to 1 bar, such that the depth of corrosion attack on each of the first and second surface segments after 10,000 h at 800° C. is no more than 10% of the wall thickness.

The fraction of the strengthening phases can be at a maximum over at least 50% of the wall thickness. The wall thickness between the first surface and the second surface is a minimum 2 mm. The alloy can be deposited by directed energy deposition, with a laser power between 200-2500 W. The alloys can be deposited by directed energy deposition, with a powder feed rate between 2-20 g/min. The alloys can be deposited by directed energy deposition, with a scan speed between 5-20 mm/s. The alloys can be deposited by directed energy deposition, with a hopper disk speed between 0.1 to 5 rpm. The alloys can be deposited by directed energy deposition, with a layer height between 0.2-2 mm.

A functionally graded alloy for separating a low oxygen content corrosive environment from a high oxygen content oxidizing environment has a thickness and a first surface segment for contacting the low oxygen content corrosive environment, and a second surface segment for contacting the high oxygen content oxidizing environment. The alloy comprises, consists essentially of, or consists of, in weight percent: 0 to 5 Al; 5 to 30 Cr; 0 to 20 Co; 0 to 70 Fe; 0 to 2 Nb; 0 to 2 Ta; 0 to 3 Ti; 0 to 1 Si; 0 to 1 V; 0 to 2 Mn; 0 to 5 Cu; 0 to 30 Mo; 0 to 30 W; 0 to 0.1 P; 0 to 1 Zr; 0 to 1 Hf; 0 to 0.1 Y; 0.05 to 0.5 C; 0 to 0.1 N; and balance Ni.

The alloy is compositionally graded from the first surface segment to the second surface segment. The composition of the alloy at the first surface segment comprises, consists essentially of, or consists of, in weight percent based on the total weight of the alloy at the first surface segment 5-15 Cr, 0-70 Fe, 0-5 Co, 0-30 Mo, 0-1 Mn, 0-0.5 Si, 0-0.1 C, balance Ni. The composition of the alloy at the second surface segment comprises, consists essentially of, or consists of, in weight percent based on the total weight of the alloy at the second surface segment, 40-70 Ni, 15-30 Cr, 0-70 Fe, 0-20 Co, 0-30 Mo, 0-3 Ti, 0-5 Al, 0-0.5 C, and balance Ni.

The functionally graded alloy has a stable FCC austenitic matrix microstructure, with strengthening phases comprising gamma prime with a volume fraction of 0 to 30% and carbides with a volume fraction of 0 to 5%, based on the total volume of the alloy.

A component for a molten salt reactor includes a wall construction for separating a low oxygen content corrosive environment from a high oxygen content oxidizing environment. The wall has a wall thickness and a first surface segment for contacting the low oxygen content corrosive environment, and a second surface segment for contacting the high oxygen content oxidizing environment. The wall has an alloy comprising, consisting essentially of, or consisting of, in weight percent: 0 to 5 Al; 5 to 30 Cr; 0 to 20 Co; 0 to 70 Fe; 0 to 2 Nb; 0 to 2 Ta; 0 to 3 Ti; 0 to 1 Si; 0 to 1 V; 0 to 2 Mn; 0 to 5 Cu; 0 to 30 Mo; 0 to 30 W; 0 to 0.1 P; 0 to 1 Zr; 0 to 1 Hf; 0 to 0.1 Y; 0.05 to 0.5 C; 0 to 0.1 N; and balance Ni. The alloy is compositionally graded from the first surface segment to the second surface segment. The composition of the alloy at the first surface segment comprises, consists essentially of, or consists of, in weight percent based on the total weight of the alloy at the first surface segment, 5-15 Cr, 0-70 Fe, 0-5 Co, 0-30 Mo, 0-1 Mn, 0-0.5 Si, 0-0.1 C, and balance Ni. The composition of the alloy at the second surface segment comprises, consists essentially of, or consists of, in weight percent based on the total weight of the alloy at the second surface segment, 15-30 Cr, 0-70 Fe, 0-20 Co, 0-30 Mo, 0-3 Ti, 0-5 Al, 0-0.5 C, and balance Ni.

The alloy has a stable FCC austenitic matrix microstructure, with strengthening phases comprising gamma prime with a volume fraction of 0 to 30% and carbides with a volume fraction of 0 to 5%, based on the total volume of the alloy. The wall provides corrosion resistance to the liquid low oxygen content corrosive environment with O content between 0 to 20,000 ppm and to the high oxygen content oxidizing environment with O partial pressure between $10^{-20}$ to 1 bar, such that the depth of corrosion attack on each of the first and second surface segments after 10,000 h at 800° C. is no more than 10% of the wall thickness.

A method of making a wall construction for a molten salt reactor having a low oxygen content corrosive environment from a high oxygen content oxidizing environment is provided. The wall has a wall thickness and a first surface segment for contacting the low oxygen content corrosive environment, and a second surface segment for contacting the high oxygen content oxidizing environment. A first alloy is provided for the first surface segment. The first alloy comprises, consists essentially of, or consists of, in weight percent based on the total weight of the alloy at the first surface segment, 5-15 Cr, 0-70 Fe, 0-5 Co, 0-30 Mo, 0-1 Mn, 0-0.5 Si, 0-0.1 C, and balance Ni. A second alloy for the second surface segment is provided. The second alloy comprises, consists essentially of, or consists of, in weight percent based on the total weight of the alloy at the second surface segment, 15-30 Cr, 0-70 Fe, 0-20 Co, 0-30 Mo, 0-3 Ti, 0-5 Al, 0-0.5 C, and balance Ni.

A compositionally graded wall is printed from the first surface segment using the first alloy to the second surface segment using the second alloy, or from the second surface segment to the first surface segment, to provide a compositionally graded alloy comprising, consisting essentially of, or consisting of, in weight percent: 0 to 5 Al; 5 to 30 Cr; 0 to 20 Co; 0 to 70 Fe; 0 to 2 Nb; 0 to 2 Ta; 0 to 3 Ti; 0 to 1 Si; 0 to 1 V; 0 to 2 Mn; 0 to 5 Cu; 0 to 30 Mo; 0 to 30 W; 0 to 0.1 P; 0 to 1 Zr; 0 to 1 Hf; 0 to 0.1 Y; 0.05 to 0.5 C; 0 to 0.1 N; and balance Ni.

The wall construction provides corrosion resistance to the liquid low oxygen content corrosive environment with O content between 0 to 20,000 ppm and to the high oxygen content oxidizing environment with O partial pressure between 10-20 to 1 bar, such that the depth of corrosion attack on the first and second surface segments after 10,000 h at 800° C. is no more than 10% of the wall thickness. The printing can be by directed energy deposition, or by other suitable methods.

BRIEF DESCRIPTION OF THE DRAWINGS

There are shown in the drawings embodiments that are presently preferred it being understood that the invention is not limited to the arrangements and instrumentalities shown, wherein.

DETAILED DESCRIPTION OF THE INVENTION

Figure 1:
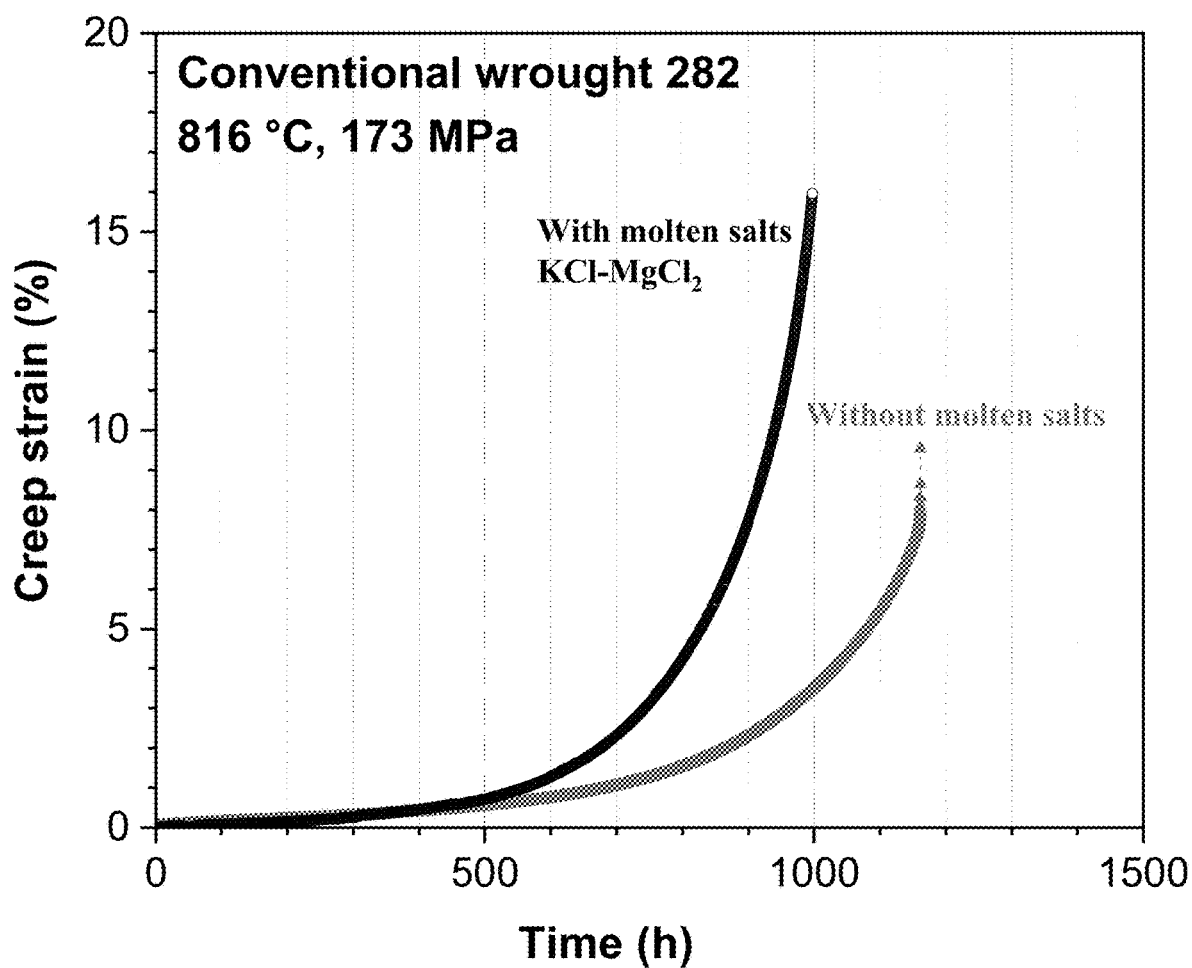
FIG. 1 is a plot of measured creep strains for UNS #N07208 specimens in air and in molten chloride salt environments at 816° C. and 173 MPa.

A wall construction is provided for separating a low oxygen content corrosive environment from a high oxygen content oxidizing environment. The wall construction is particularly suited for molten salt reactors, but also can have other applications.

The wall has a wall thickness and a first surface segment for contacting the low oxygen content corrosive environment, and a second surface segment for contacting the high oxygen content oxidizing environment. The term "surface segment" as used herein means the respective first or second surfaces of the wall, including the surface layer of the alloy composition and possibly also several subsurface layers where the surface composition is the same. The term surface segment means that the composition of the alloy at each surface of the wall can remain the same for several subsurface layers extending inward from the surface molecular layer, after which the alloy is compositionally graded from the first surface segment to the second surface segment. For example, the term first surface segment can refer to up to 50% of the wall thickness from a first surface molecular layer of the first surface segment to several subsurface layers extending inward from the first surface layer. The first surface segment can be 0 (only the surface layer), 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49 or 50% of the wall thickness, extending inward from the first surface layer, or within a range of any high or low value selected from these values. The term second surface segment can refer to up to 50% of the wall thickness from the second surface molecular layer of the second surface segment to several subsurface layers extending inward from the second surface layer. The second surface segment can be 0 (only the surface layer), 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49 or 50% of the wall thickness, extending inward from the second surface layer, or within a range of any high value and low value selected from these values.

The wall comprises an alloy comprising, consisting essentially of, or consisting of, in weight percent: 0 to 5 Al; 5 to 30 Cr; 0 to 20 Co; 0 to 70 Fe; 0 to 2 Nb; 0 to 2 Ta; 0 to 3 Ti; 0 to 1 Si; 0 to 1 V; 0 to 2 Mn; 0 to 5 Cu; 0 to 30 Mo; 0 to 30 W; 0 to 0.1 P; 0 to 1 Zr; 0 to 1 Hf; 0 to 0.1 Y; 0.05 to 0.5 C; 0 to 0.1 N; and balance Ni. The composition of the alloy is graded from the first surface segment to the second surface segment and so these are average values across the thickness from the first surface segment to the second surface segment.

The alloy can be step-wise compositionally graded from the first surface segment to the second surface segment. The alloy composition at the first surface segment comprises, consists essentially of, or consists of, in weight percent based on the total composition of the alloy at the first surface segment, 5-15 Cr, 0-70 Fe, 0-5 Co, 0-30 Mo, 0-1 Mn, 0-0.5 Si, 0-0.1 C, and balance Ni. The alloy composition at the second surface segment comprises, consists essentially of, or consists of, in weight percent based on the total composition of the alloy at the second surface segment, 15-30 Cr, 0-70 Fe, 0-20 Co, 0-30 Mo, 0-3 Ti, 0-5 Al, 0-0.5 C, and balance Ni. The compositional grading can be linear, step-wise, or other depending on the requirements of the wall.

The alloy has a stable FCC austenitic matrix microstructure, with strengthening phases comprising gamma prime with a volume fraction of 0 to 30% and carbides with a volume fraction of 0 to 5%. The volume fraction of gamma prime based on the total volume of the alloy can be 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 vol %, and can be within a range of any high value and low value selected from these values. The volume fraction of MC, and $M_6C$ type carbides (where M is a metallic element), based on the total volume of the alloy, can be 0, 0.5, 1, 1.5, 2, 2.5, 3, 3.5, 4, 4.5 or 5 vol %, and can be within a range of any high value and low value selected from these values. Possible carbides include, but are not limited to, Mo-rich $M_6C$-type carbides, Cr-rich $M_{23}C_6$-type carbides and Ti-rich MC-type carbides.

The wall can provide corrosion resistance to the liquid low oxygen content corrosive environment with O content between 0 to 20,000 ppm and to the high oxygen content oxidizing environment with O partial pressure between 10-20 to 1 bar, such that the depth of corrosion attack on the first and second surface segments after 10,000 h at 800° C. is no more than 10% of the wall thickness.

The alloy can include from 0 to 5 wt % Al, based on the total weight of the alloy. The Al can be 0, 0.5, 1, 1.5, 2, 2.5, 3, 3.5, 4, 4.5 or 5 wt. %. The weight percent of Al in the alloy can be within a range of any high value and low value selected from these values.

The amount of Cr in the alloy can be from 5 to 30 wt. %, based on the total weight of the alloy. The amount of Cr in the alloy, in weight percent, can be 5, 6, 7, 8, 9, 10, 11, 12, 13, 14, 15, 16, 17, 18, 19, 20, 21, 22, 23, 24, 25, 26, 27, 28, 29, or 30 wt. %. The weight percent of Cr in the alloy can be within a range of any high value and low value selected from these values.

The amount of Co in the alloy can be from 0 to 20 wt. %, based on the total weight of the alloy. The amount of Co in the alloy can be 0, 1, 2, 3, 4, 5, 6, 7, 8, 9, 10, 11, 12, 13, 14, 15, 16, 17, 18, 19, or 20 wt. %. The weight percent of Co in the alloy can be within a range of any high value and low value selected from these values.

The amount of Fe in the alloy can be from 0 to 70 wt. %, based on the total weight of the alloy. The amount of Fe in the alloy can be 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, or 70 wt. %. The weight percent of Fe in the alloy can be within a range of any high value and low value selected from these values.

The amount of Nb in the alloy can be from 0 to 2 wt. %, based on the total weight of the alloy. The amount of Nb in the alloy can be 0, 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9 or 2 wt. %. The weight percent of Nb in the alloy can be within a range of any high value and low value selected from these values.

The amount of Ta in the alloy can be from 0 to 2 wt. %, based on the total weight of the alloy. The amount of Ta in the alloy can be 0, 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9 or 2 wt. %. The weight percent of Ta in the alloy can be within a range of any high value and low value selected from these values.

The amount of Ti in the alloy can be from 0 to 3 wt. %, based on the total weight of the alloy. The amount of Ti in the alloy can be 0, 0.2, 0.4, 0.6, 0.8, 1.0, 1.2, 1.4, 1.6, 1.8, 2.0, 2.2, 2.4, 2.6, 2.8 or 3 wt. %. The weight percent of Ti in the alloy can be within a range of any high value and low value selected from these values.

The amount of Si in the alloy can be from 0 to 1 wt. %, based on the total weight of the alloy. The amount of Si in the alloy can be 0, 0.1, 0.2, 0.3, 0.4, 0.5, 0.6, 0.7, 0.8, 0.9, or 1 wt. %. The weight percent of Si in the alloy can be within a range of any high value and low value selected from these values.

The amount of V in the alloy can be from 0 to 1 wt. %, based on the total weight of the alloy. The amount of V in the alloy can be 0, 0.1, 0.2, 0.3, 0.4, 0.5, 0.6, 0.7, 0.8, 0.9, or 1 wt. %. The weight percent of V in the alloy can be within a range of any high value and low value selected from these values.

The amount of Mn in the alloy can be from 0 to 2 wt. %, based on the total weight of the alloy. The amount of Mn in the alloy can be 0, 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9 or 2 wt. %. The weight percent of Mn in the alloy can be within a range of any high value and low value selected from these values.

The amount of Cu in the alloy can be from 0 to 5 wt. %, based on the total weight of the alloy. The amount of Cu in the alloy can be 0, 0.5, 1, 1.5, 2, 2.5, 3, 3.5, 4, 4.5, or 5 wt. %. The weight percent of Cu in the alloy can be within a range of any high value and low value selected from these values.

The amount of Mo in the alloy can be from 0 to 30 wt. %, based on the total weight of the alloy. The amount of Mo in the alloy can be 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 wt. %. The weight percent of Mo in the alloy can be within a range of any high value and low value selected from these values.

The amount of W in the alloy can be from 0 to 30 wt. %, based on the total weight of the alloy. The amount of W in the alloy can be 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 wt. %. The weight percent of W in the alloy can be within a range of any high value and low value selected from these values.

The amount of P in the alloy can be from 0 to 0.1 wt. %, based on the total weight of the alloy. The amount of P in the alloy can be 0, 0.01, 0.02, 0.03, 0.04, 0.05, 0.06, 0.07, 0.08, 0.09, or 0.1 wt. %. The weight percent of P in the alloy can be within a range of any high value and low value selected from these values.

The amount of Zr in the alloy can be from 0 to 1 wt. %, based on the total weight of the alloy. The amount of Zr in the alloy can be 0, 0.1, 0.2, 0.3, 0.4, 0.5, 0.6, 0.7, 0.8, 0.9, or 1 wt. %. The weight percent of Zr in the alloy can be within a range of any high value and low value selected from these values.

The amount of Hf in the alloy can be from 0 to 1 wt. %, based on the total weight of the alloy. The amount of Hf in the alloy can be 0, 0.1, 0.2, 0.3, 0.4, 0.5, 0.6, 0.7, 0.8, 0.9, or 1 wt. %. The weight percent of Hf in the alloy can be within a range of any high value and low value selected from these values.

The amount of Y in the alloy can be from 0 to 0.1 wt. %, based on the total weight of the alloy. The amount of Y in the alloy can be 0, 0.01, 0.02, 0.03, 0.04, 0.05, 0.06, 0.07, 0.08, 0.09, or 0.1 wt. %. The weight percent of Y in the alloy can be within a range of any high value and low value selected from these values.

The amount of C in the alloy can be from 0.05 to 0.5 wt. %, based on the total weight of the alloy. The amount of C in the alloy can be 0.05, 0.10, 0.15, 0.20, 0.25, 0.30, 0.35, 0.40, 0.45, or 0.5 wt. %. The weight percent of C in the alloy can be within a range of any high value and low value selected from these values.

The amount of N in the alloy can be from 0 to 0.1 wt. %, based on the total weight of the alloy. The amount of N in the alloy can be 0, 0.01, 0.02, 0.03, 0.04, 0.05, 0.06, 0.07, 0.08, 0.09, or 0.1 wt. %. The weight percent of N in the alloy at the first surface segment can be within a range of any high value and low value selected from these values.

The composition of the alloy at the first surface segment can comprise from 60-80 wt. % Ni, based on the total weight of the alloy at the first surface segment. The amount of Ni in the alloy at the first surface segment can be 60, 61, 62, 63, 64, 65, 66, 67, 68, 69, 70, 71, 72, 73, 74, 75, 76, 77, 78, 79 or 80 wt. %. The weight percent of Ni in the alloy at the first surface segment can be within a range of any high value and low value selected from these values.

The composition of the alloy at the first surface segment can comprise from 5-15 wt. % Cr, based on the total weight of the alloy at the first surface segment. The amount of Cr in the alloy at the first surface segment can be 5, 6, 7, 8, 9, 10, 11, 12, 13, 14, or 15 wt. %. The weight percent of Cr in the alloy at the first surface segment can be within a range of any high value and low value selected from these values.

The composition of the alloy at the first surface segment can comprise from 0-70 wt. % Fe, based on the total weight of the alloy at the first surface segment. The amount of Fe at the first surface segment can be 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, or 70 wt. %. The weight percent of Fe in the alloy at the first surface segment can be within a range of any high value and low value selected from these values.

The composition of the alloy at the first surface segment can comprise from 0-5 wt. % Co, based on the total weight of the alloy at the first surface segment. The amount of Co at the first surface segment can be 0, 0.5, 1, 1.5, 2, 2.5, 3, 3.5, 4, 4.5, or 5 wt. %. The weight percent of Co in the alloy at the first surface segment can be within a range of any high value and low value selected from these values.

The composition of the alloy at the first surface segment can be from 0-30 wt. % Mo, based on the total weight of the alloy at the first surface segment. The amount of Mo at the first surface segment can be 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 wt. %. The weight percent of Mo in the alloy at the first surface segment can be within a range of any high value and low value selected from these values.

The composition of the alloy at the first surface segment can comprise from 0-1 wt. % Mn, based on the total weight of the alloy at the first surface segment. The amount of Mn at the first surface segment can be 0, 0.1, 0.2, 0.3, 0.4, 0.5, 0.6, 0.7, 0.8, 0.9, or 1 wt. %. The weight percent of Mn in the alloy at the first surface segment can be within a range of any high value and low value selected from these values.

The composition of the alloy at the first surface segment can comprise from 0-0.5 wt. % Si, based on the total weight of the alloy at the first surface segment. The amount of Si at the first surface segment can be 0, 0.05, 0.10, 0.15, 0.20, 0.25, 0.30, 0.35, 0.40, 0.45, or 0.5 wt. %. The weight percent of Si in the alloy at the first surface segment can be within a range of any high value and low value selected from these values.

The composition of the alloy at the first surface segment can comprise from 0-0.1 wt. % C, based on the total weight of the alloy at the first surface segment. The amount of C at the first surface segment can be 0, 0.01, 0.02, 0.03, 0.04, 0.05, 0.06, 0.07, 0.08, 0.09, or 0.1 wt. %. The weight percent of C in the alloy at the first surface segment can be within a range of any high value and low value selected from these values.

The composition of the alloy at the second surface segment can comprise from 40-70 wt. % Ni, based on the total weight of the alloy at the second surface segment. The amount of Ni at the second surface segment can be 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, or 70 wt. %. The weight percent of Ni in the alloy at the second surface segment can be within a range of any high value and low value selected from these values.

The composition of the alloy at the second surface segment can comprise from 15-30 wt. % Cr, based on the total weight of the alloy at the second surface segment. The amount of Cr at the second surface segment can be 15, 16, 17, 18, 19, 20, 21, 22, 23, 24, 25, 26, 27, 28, 29, or 30 wt. %. The weight percent of Cr in the alloy at the second surface segment can be within a range of any high value and low value selected from these values.

The composition of the alloy at the second surface segment can comprise from 0-70 wt. % Fe, based on the total weight of the alloy at the second surface segment. The amount of Fe at the second surface segment can be 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, or 70 wt. %. The weight percent of Fe in the alloy at the second surface segment can be within a range of any high value and low value selected from these values.

The composition of the alloy at the second surface segment can be comprise from 0-20 wt. % Co, based on the total weight of the alloy at the second surface segment. The amount of Co at the second surface segment can be 0, 1, 2, 3, 4, 5, 6, 7, 8, 9, 10, 11, 12, 13, 14, 15, 16, 17, 18, 19, or 20 wt. %. The weight percent of Co in the alloy at the second surface segment can be within a range of any high value and low value selected from these values.

The composition of the alloy at the second surface segment can comprise from 0-30 wt. % Mo, based on the total weight of the alloy at the second surface segment. The amount of Mo at the second surface segment can be 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 wt. %. The weight percent of Mo in the alloy at the second surface segment can be within a range of any high value and low value selected from these values.

The composition of the alloy at the second surface segment can comprise from 0-3 wt. % Ti, based on the total weight of the alloy at the second surface segment. The amount of Ti at the second surface segment can be 0, 0.2, 0.4, 0.6, 0.8, 1.0, 1.2, 1.4, 1.6, 1.8, 2.0, 2.2, 2.4, 2.6, 2.8 or 3 wt. %. The weight percent of Ti in the alloy at the second surface segment can be within a range of any high value and low value selected from these values.

The composition of the alloy at the second surface segment can comprise from 0-5 wt. % Al, based on the total weight of the alloy at the second surface segment. The amount of Al at the second surface segment can be 0, 0.5, 1, 1.5, 2, 2.5, 3, 3.5, 4, 4.5, or 5. The weight percent of Al in the alloy at the second surface segment can be within a range of any high value and low value selected from these values.

The composition of the second surface segment can comprise from 0-0.5 wt. % C, based on the total weight of the alloy at the second surface segment. The amount of C at the second surface segment can be 0, 0.05, 0.10, 0.15, 0.20, 0.25, 0.30, 0.35, 0.40, 0.45, or 0.5 wt. %. The weight percent of C in the alloy at the second surface segment can be within a range of any high value and low value selected from these values.

The fraction of the strengthening phases can be at a maximum over at least 50% of the wall thickness. The wall can have any thickness. The wall in some embodiments can be greater than 2 mm in thickness. The types of articles that can be made with the graded alloy construction of the invention include plate type heat exchangers, shell and tube heat exchangers, containment structures such as pipes and storage tanks, heat pipes, and fluidized bed heat exchangers, and in general wherever there is a need for surface protection and no compromise in mechanical properties is desired or dual corrosive environments exist on opposing surfaces.

The alloy can be deposited by any suitable additive manufacturing method. The alloy can be deposited by directed energy deposition. The laser power can be between 200-2500 W. The powder feed rate can be between 2-20 g/min. The scan speed can be between 5-20 mm/s. The hopper disk speed can be between 0.1 to 5 rpm. The layer height can be between 0.2-2 mm.

The invention provides manufacturing techniques that synergistically integrate established, high-fidelity, physics-based thermo-kinetic models enabling co-design by enabling a parallel rather than series approach to design of mechanical and corrosion stability, and fabrication of digitally graded architectures with precisely tailored zone-based properties. The invention provides alloy systems for molten salt reactors for operation at higher temperatures greater than 750° C. A blown powder directed energy deposition (DED) additive manufacturing technique is employed to generate builds with graded compositions from UNS #N1003 alloy (to UNS #N07208 alloys. A coupled thermo-dynamic-kinetic model was employed to determine the compositional gradients that will facilitate corrosion resistant surfaces for dual environments while simultaneously mitigating the corrosion-induced degradation of strengthening phases in the alloy. Non-equilibrium solidification calculations were performed to identify compositional spaces which could lead to formation of brittle detrimental phases. Furthermore, simulations were conducted to predict the material behavior during operation in realistic test conditions and evaluate the long-term stability of the graded alloy. The modeling results were validated with corresponding experimental data from mechanical and corrosion testing.

Compositionally graded blocks were additively manufactured using blown powder Directed Energy Deposition (DED), a popular melt modality for high throughput fabrication of large-scale structures. The DED modality provides a unique opportunity to regulate deposition rates of terminal alloys via a multi-hopper powder-feeder system. Preliminary additive manufacturing trials had two distinct goals (i) independent parameter development of UNS #N07208 and UNS #N1003 depositions which was essential to produce robust builds with minimal defect density and close to optimal microstructure and (ii) deposition of two terminal alloy compositions directly on top of one another—to compare with the study of diffusion couples made from wrought UNS #N07208 and UNS #N1003 alloys. The measured compositions of the powders used for printing the materials are given in Table 2. Deviations in the powder chemistry from the wrought alloys were observed for UNS #N1003 with slightly lower concentrations of Fe, Mn and Si and a higher concentration of C. The powder chemistry of UNS #N07208 agreed well with the wrought variant.

TABLE 2

Measured compositions (wt. %) of the HN and 282 powders determined by plasma and combustion analyses.

| Alloy | Ni | Cr | Fe | Co | Mo | Ti | Al | Other |
|---|---|---|---|---|---|---|---|---|
| HN | 73.4 | 7.4 | 3.3 | 0.03 | 15.6 | — | — | Mn 0.07 Si 0.05 C 0.07 |
| 282 | 58.0 | 19.2 | 0.3 | 10.2 | 8.5 | 2.1 | 1.5 | C 0.05 |

Initially, monolithic builds (~2"×2"×2") of individual compositions were attempted on 316L stainless steel substrate. The build trials of UNS #N07208 and UNS #N1003 alloys consisted of keeping constant laser power, laser scan speed, powder flow rate as well as spot size, while varying the layer height (gap between subsequent build layers) and step over distance (gap between two subsequent scan passes in the same layer). Visual inspection of successful builds was followed by computerized tomography (CT) scans of bulk builds and the generation of large scale mosaics from optical images to analyze the defect size and distribution within these specimens, which was critical for optimization of build parameters for each of the two alloys. Suitable ranges for the printing parameters are shown in the Table 3. For the generation of an abrupt compositional interface along the build direction, a 2"×2"×1"282 cube was built on a 316L substrate, followed by the fabrication of an UNS #N1003 cube of similar dimension directly on top of UNS #N07208. For these monolithic and abruptly graded builds, careful multiscale characterizations of the ensuing microstructures were undertaken.

TABLE 3

Printing Parameters

| Laser power (W) | Powder Feed rate (g/min) | Scan speed (mm/s) | Layer height (mm) | Spot size | Laser rotation between layers |
|---|---|---|---|---|---|
| 300-2500 | 10-15 | 10-15 | 0.4-1.5 | 1-4 mm | 90° |

The laser power can be from 300 to 2500 W. The laser power can be 300, 400, 500, 600, 700, 800, 900, 1000, 1100, 1200, 1300, 1400, 1500, 1600, 1700, 1800, 1900, 2000, 2100, 2200, 2300, 2400, or 2500 W. The laser power can be within a range of any high value and low value selected from these values.

The powder feed rate can be from 10 to 15 g/min. The powder feed rate can be 10, 10.5, 11, 11.5, 12, 12.5, 13, 13.5, 14, 14.5, or 15 g/min. The powder feed rate can be within a range of any high value and low value selected from these values.

The scan speed can be from 10 to 15 mm/s. The scan speed can be 10, 10.5, 11, 11.5, 12, 12.5, 13, 13.5, 14, 14.5, or 15 mm/s. The scan speed can be within a range of any high value and low value selected from these values.

The layer height can be from 0.4 to 1.5 mm. The layer height can be 0.4, 0.5, 0.6, 0.7, 0.8, 0.9, 1.0, 1.1, 1.2, 1.3, 1.4, or 1.5 mm. The layer height can be within a range of any high value and low value selected from these values.

The spot size can be from 1.0 to 4.0 mm. The spot size can be 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9 or 4.0 mm. The spot size can be within a range of any high value and low value selected from these values.

A functionally graded alloy for separating a low oxygen content corrosive environment from a high oxygen content oxidizing environment, comprises a thickness and a first surface segment for contacting the low oxygen content corrosive environment, and a second surface segment for contacting the high oxygen content oxidizing environment. The alloy comprises, in weight percent: 0 to 5 Al; 5 to 30 Cr; 0 to 20 Co; 0 to 70 Fe; 0 to 2 Nb; 0 to 2 Ta; 0 to 3 Ti; 0 to 1 Si; 0 to 1 V; 0 to 2 Mn; 0 to 5 Cu; 0 to 30 Mo; 0 to 30 W; 0 to 0.1 P; 0 to 1 Zr; 0 to 1 Hf; 0 to 0.1 Y; 0.05 to 0.5 C; 0 to 0.1 N; and balance Ni. The alloy is graded from the first surface segment to the second surface segment. The composition of the alloy at the first surface segment comprises, in weight percent based on the total weight of the alloy at the first surface segment, 5-15 Cr, 0-70 Fe, 0-5 Co, 0-30 Mo, 0-1 Mn, 0-0.5 Si, 0-0.1 C, balance Ni. The composition of the alloy at the second surface segment comprises, in weight percent based on the total weight of the alloy at the second surface segment, 15-30 Cr, 0-70 Fe, 0-20 Co, 0-30 Mo, 0-3 Ti, 0-5 Al, 0-0.5 C, balance Ni. The alloy has a stable FCC austenitic matrix microstructure, with strengthening phases comprising gamma prime with a volume fraction of 0 to 30% and carbides with a volume fraction of 0 to 5%, based on the total volume of the alloy.

A method of making a wall construction for a molten salt reactor having a low oxygen content corrosive environment from a high oxygen content oxidizing environment, is provided. The wall has a wall thickness and a first surface segment for contacting the low oxygen content corrosive environment, and a second surface segment for contacting the high oxygen content oxidizing environment. A first alloy is provided for the first surface segment, the first alloy comprising, in weight percent based on the total weight of the alloy at the first surface segment, 5-15 Cr, 0-70 Fe, 0-5 Co, 0-30 Mo, 0-1 Mn, 0-0.5 Si, 0-0.1 C, balance Ni. A second alloy is provided for the second surface segment, the second alloy comprising, in weight percent based on the total weight of the alloy at the second surface segment, 15-30 Cr, 0-70 Fe, 0-20 Co, 0-30 Mo, 0-3 Ti, 0-5 Al, 0-0.5 C, balance Ni. A compositionally graded wall is printed from the first surface segment using the first alloy to the second surface segment using the second alloy, to provide a compositionally and functionally graded alloy comprising, in weight percent: 0 to 5 Al; 5 to 30 Cr; 0 to 20 Co; 0 to 70 Fe; 0 to 2 Nb; 0 to 2 Ta; 0 to 3 Ti; 0 to 1 Si; 0 to 1 V; 0 to 2 Mn; 0 to 5 Cu; 0 to 30 Mo; 0 to 30 W; 0 to 0.1 P; 0 to 1 Zr; 0 to 1 Hf; 0 to 0.1 Y; 0.05 to 0.5 C; 0 to 0.1 N; and balance Ni. The wall construction provides corrosion resistance to the liquid low oxygen content corrosive environment with O content between 0 to 20,000 ppm and to the high oxygen content oxidizing environment with O partial pressure between 10-20 to 1 bar, such that the depth of corrosion attack on the first and second surface segments after 10,000 h at 800° C. is no more than 10% of the wall thickness. The printing can be by any suitable process including, but not limited to, directed energy deposition.

In one embodiment, the laser power is approximately 2200 W. In another embodiment, the powder feed rate is approximately 12 g/min. In a further embodiment, the scan speed is approximately 13.5 mm/s. In yet a further embodiment, the layer height is approximately 0.84 mm. In still another embodiment, the laser rotation between layers is approximately 90°.

For example, parameters used for the fabrication runs for the build trials discussed herein are shown in Table 4 below:

TABLE 4

Parameters for Fabrication Runs

| Laser power (W) | Powder Feed rate (g/min) | Scan speed (mm/s) | Layer height (mm) | Laser rotation between layers |
|---|---|---|---|---|
| 2200 | 12 | 13.5 | 0.84 | 90° |

A previously developed coupled thermodynamic-kinetic approach by one of the inventors was employed to model the interdiffusion in the UNS #N1003-UNS3N07208 diffusion couple, the simultaneously occurring oxidation, diffusion and dissolution processes in the dual material during high temperature exposures in the molten chloride salt. To enable realistic computational times for simulation of exposure duration (e.g., 20-40 kh), the modelling procedure was modified further to allow calculations to be run on parallel computing cores.

Corrosion testing of specimens in the binary KCl—$MgCl_2$ mixture at 816° C. for 500 h clearly showed the differences in attack on the two materials. The measured depletion of Cr in UNS #N1003 and UNS3N07208 after exposure for 500 h in the binary KCl—$MgCl_2$ eutectic (68:32 mol. %) salt mixture at 816° C. in Mo-capsules. The depth of Cr depletion (or of corrosive attack) was 20±3 μm in UNS #N07208 while a minimal attack of 3±2 μm was measured in UNS #N1003. There is no or little data for the corrosion behavior of 282 in molten chloride salts in the literature. It has been demonstrated for model Ni-based, Fe-based and multicomponent Ni-based alloys, 600, C276, 740H and 230 that the chemical activity and diffusion of Cr in the alloy primarily govern the corrosion kinetics during exposures in purified chloride salts. The calculated Cr activity of UNS #N07208 is about 7.5 times higher than in UNS #N1003 and significant corrosion can be expected for UNS #N07208 in molten halide salts after longer exposure times (10-30 kh). Although the primary alloying element dissolving in the halide salts from Ni-based and Fe-based alloys has been reported to be Cr, concurrent depletion of alloying constituents such as Fe, Mn and Ti is possible and has been reported before.

Figure 2A:
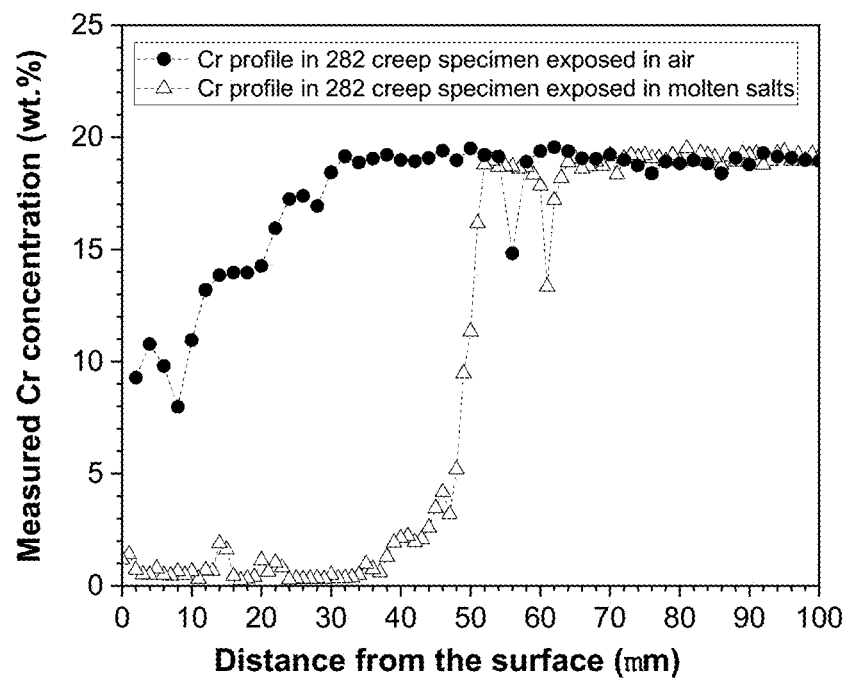
FIG. 2A is a plot of measured Cr concentration (wt. %)
Figure 2B:
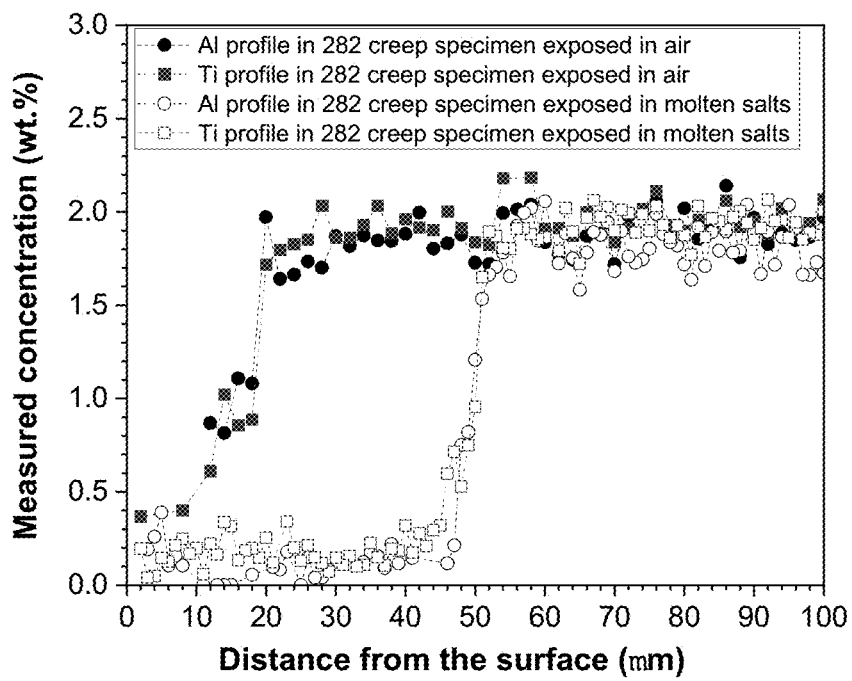
FIG. 2B is a plot of measured Al and Ti concentration (wt. %) in UNS #N07208 creep specimens versus the distance (μm) from the surface, tested in air and in molten chloride salt environments at 816° C. and 173 MPa.

This simultaneous depletion of Al and Ti which stabilize the strengthening γ' (gamma prime)-phase in UNS #N07208 will result in dissolution of the γ'-phase and thereby potential loss in its creep rupture strength in a molten salts environment. FIG. 1 shows the comparison between measured creep strains for UNS #N07208 specimens in air and in molten chloride salt environments at 816° C. and 173 MPa. It is evident that the creep strains in the molten salt environment are considerably higher than the ones measured in air. There is almost a 15% reduction in creep rupture life for the specimen creep tested in molten salts. FIGS. 2A and 2B show the measured depletion of Cr, Al and Ti respectively which confirms the depletion of the γ'-phase strengthening elements and thereby dissolution of the γ'-phase. A higher depth of attack (about 2 times) in terms of the depletion of the key elements can be observed for the exposures in molten salts compared to air exposures.

Figure 3:
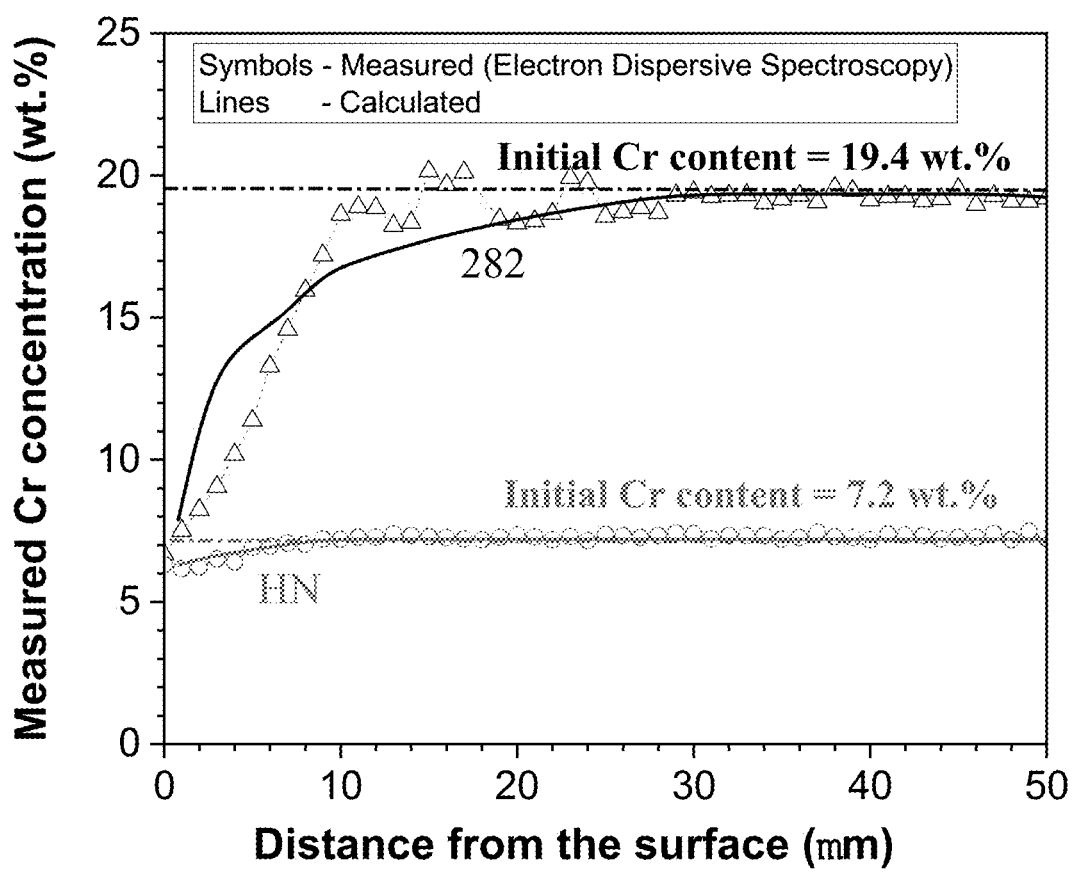
FIG. 3 is a comparison between measured (Electron Dispersive Spectroscopy, average of 3 line profiles) and calculated Cr concentration profiles in UNS #N1003 and UNS #N07208 versus distance from the surface (μm) after exposure for 500 h in a binary KCl-M$_g$Cl$_2$ eutectic (68:32 mol. %) salt mixture at 816° C. in Mo-capsules.

FIG. 3 compares the measured (EDS, average of 3 line profiles) and calculated Cr concentration profiles in UNS #N1003 and UNS #N07208 after exposure for 500 h in the binary KCl—$MgCl_2$ eutectic (68:32 mol. %) salt mixture at 816° C. in Mo-capsules. The agreement is acceptable for both alloys and the model can clearly show the differences in corrosion behavior between the two alloys. It is well-established that UNS #N07208 is a suitable material for $sCO_2$-applications. The long-term oxidation behavior of UNS #N07208 in 300 bar $sCO_2$ has been studied extensively between 700-800° C. for exposure times up to 10 kh. The alloy primarily forms an external $Cr_2O_3$ scale and was predicted to form this scale for up to 10 kh at a maximum temperature 820° C.

Figure 4:
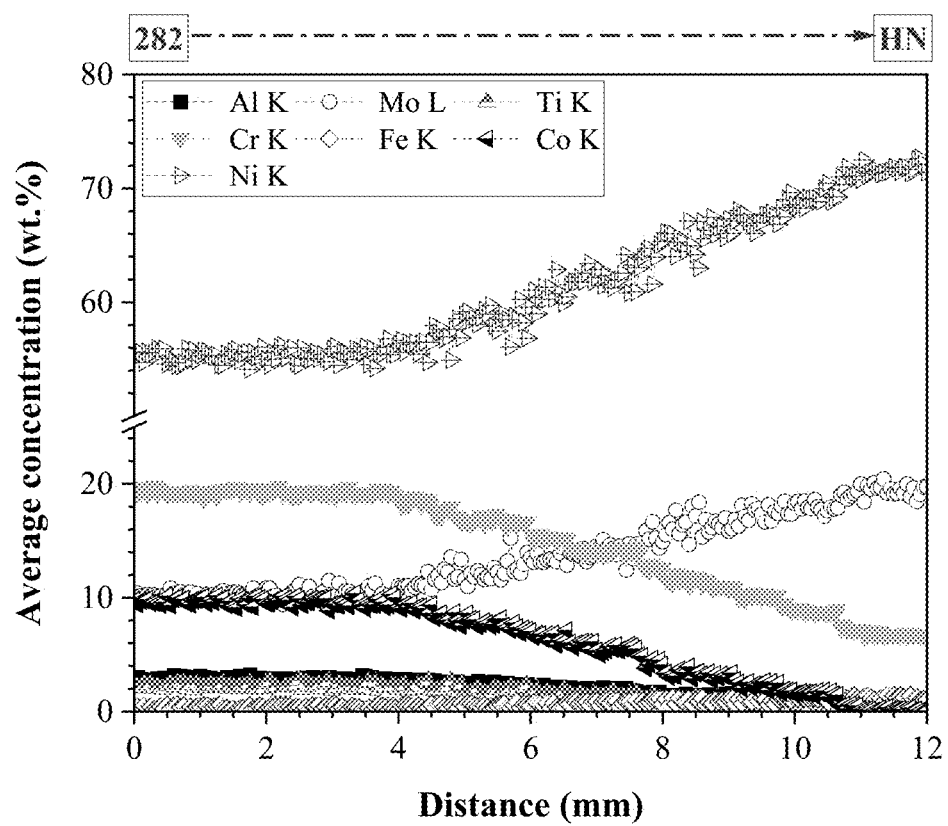
FIG. 4 is a measured concentration profile versus distance (mm) in a graded dual UNS #N1003-UNS #N07208 material.

The good agreement of the model predictions with the experiments instill confidence in the applicability of the chosen approach to describe compositional changes and microstructural evolution in the dual material during annealing and subsequent high temperature exposures in the relevant operating environments. Analyses of the impact of the corrosion-induced microstructural changes on the mechanical properties was employed to strategize the grading of the additively manufactured dual material. A representative compositional grading is shown in FIG. 4.

Figure 6:
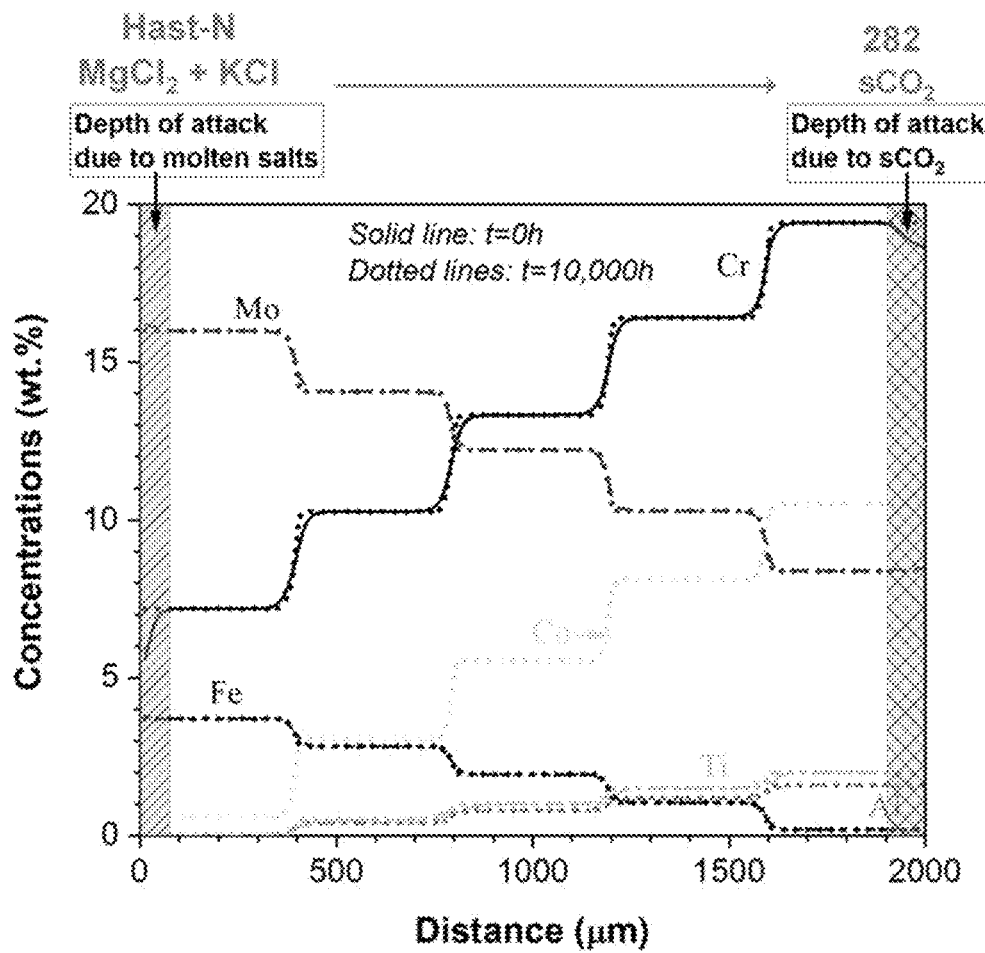
FIG. 6 is a calculated compositional evolution (wt. %) versus distance (mm) for a dual graded UNS #N1003-UNS #N07208 material exposed to molten chloride salts on the UNS #N1003 surface and sCO$_2$ on the UNS #N07208 surface for 10,000 h at 800° C.

FIG. 6 shows the calculated compositional evolution for a dual graded UNS #N1003-UNS #N07208 material exposed to molten chloride salts on the UNS #N1003 surface and $sCO_2$ on the UNS #N07208 surfaces for 10,000 h at 800° C. It is evident from the figure that even after 10,000 h, there is negligible interdiffusion across the material indicating that the material chemistry is expected to be stable for long durations in service. In contrast, significant compositional and microstructural changes will occur with a coated alloy due to the inherent chemical incompatibility between a corrosion resistant coating and substrate material. The corrosion resistance can be quantified. Furthermore, the depth of corrosion attack on the molten salts side of the wall is about 70 μm and 100 μm on the $sCO_2$ side of the wall which is ≤10% of the total material thickness of 2000 μm.

Figure 5:
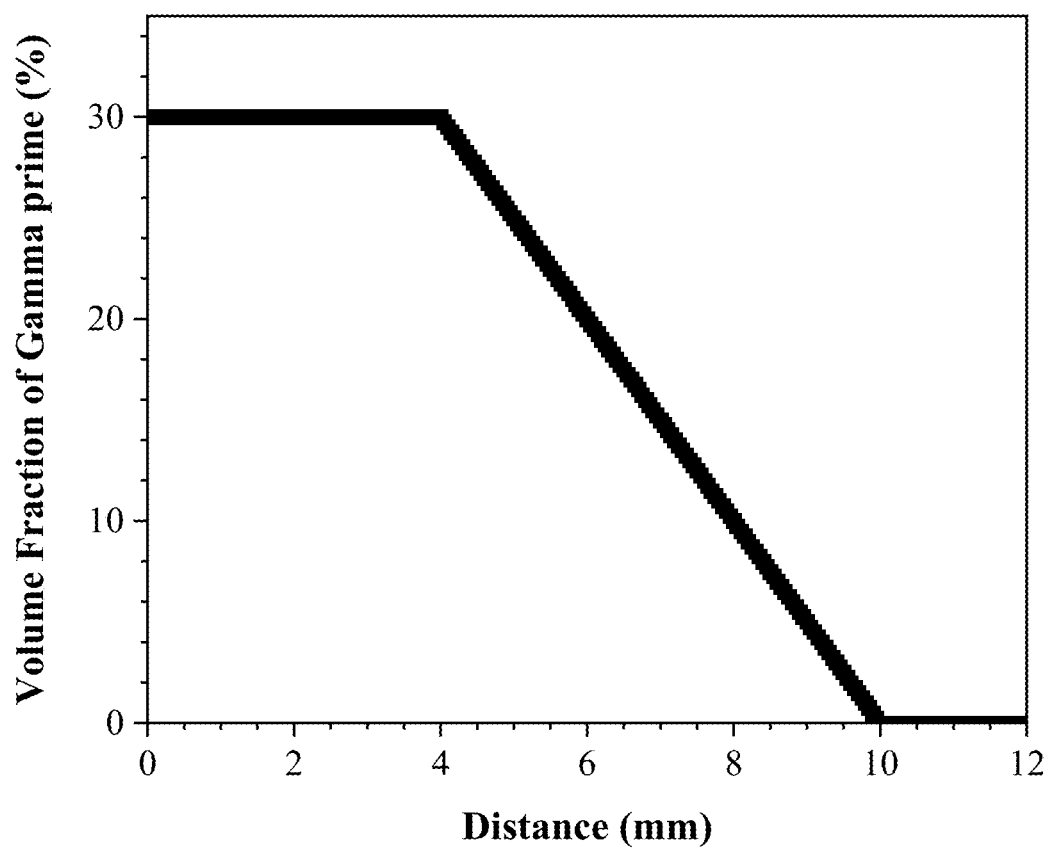
FIG. 5 is a calculated volume fraction of gamma prime (γ') versus distance (mm) in a graded dual UNS #N1003-UNS #N07208 material.

The dual alloy consists essentially of a stable FCC austenitic matrix and contains one or more carbides and coherent precipitates of γ' over at least 50% of the material thickness. As shown in FIG. 5, the volume fraction of the $L1_2$ (γ') phase can be from 0 to 30% at 800° C. The volume fraction of the $L1_2$ (γ') phase can be 0, 1, 2, 3, 4, 5, 6, 7, 8, 9, 10, 11, 12, 13, 14, 15, 16, 17, 18, 19, 20, 21, 22, 23, 24, 25, 26, 27, 28, 29 or 30% at 800° C. The volume fraction of the $L1_2$ (γ') phase can be within a range of any high value and low value selected from these values.

The volume fraction of the MC phase at 800° C. can be between 0 to 1.0%. The volume fraction of the MC phase at 800° C. can be 0, 0.1, 0.2, 0.3, 0.4, 0.5, 0.6, 0.7, 0.8, 0.9, 1.0%. The volume fraction of the MC phase at 800° C. can be within a range of any high value and low value selected from these values.

The volume fraction of the $M_6C$ phase at 800° C. can be between 0 to 0.5%. The volume fraction of the $M_6C$ phase at 800° C. can be 0, 0.1, 0.2, 0.3, 0.4 and 0.5%. The volume fraction of the $M_6C$ phase at 800° C. can be within a range of any high value and low value selected from these values.

The compositional grading of the materials in this invention were carefully designed and optimized to balance mechanical strength and corrosion resistance in the two distinct environments on opposing surfaces. For operation at a target temperature of 816° C. for 10,000 h, up to 20 wt. % Mo and up to 10 wt. % Cr can be present in the alloy for a minimum of 10% volume of a 2 mm thick material to enhance the corrosion resistance on the molten salts side of the wall. Additionally, up to 3 wt. % Ti, up to 2 wt. % Al and up to 10 wt. % Mo can be present in the alloy for a minimum of 50% volume of a 2 mm thick material to enhance the mechanical properties of the alloy.

Within the allowable ranges of elements, particularly those of Al, Ti, Cr, Ni, Fe, Mo and W, the levels of the elements are adjusted relative to their respective concentrations to achieve a stable austenite phase matrix with desired strengthening phases while preventing formation of a significant fraction of brittle intermetallic phases during solidification of the melt pool. Additional non-equilibrium phases might form during solidification but the expected intermetallic phases, if any, will be limited to <0.1 vol. % within the compositional ranges of this invention.

The fabrication parameters were optimized in a fashion to enable rapid transition between different material chemistries while simultaneously avoiding print parameters that might result in potential defects and porosity. The invention required a suitable combination of laser power and spot size to achieve the minimum layer height of 0.3 mm that allows manufacturing a graded dual material with a minimum material thickness of 2 mm between the first and the second surface segments.

Figure 7:
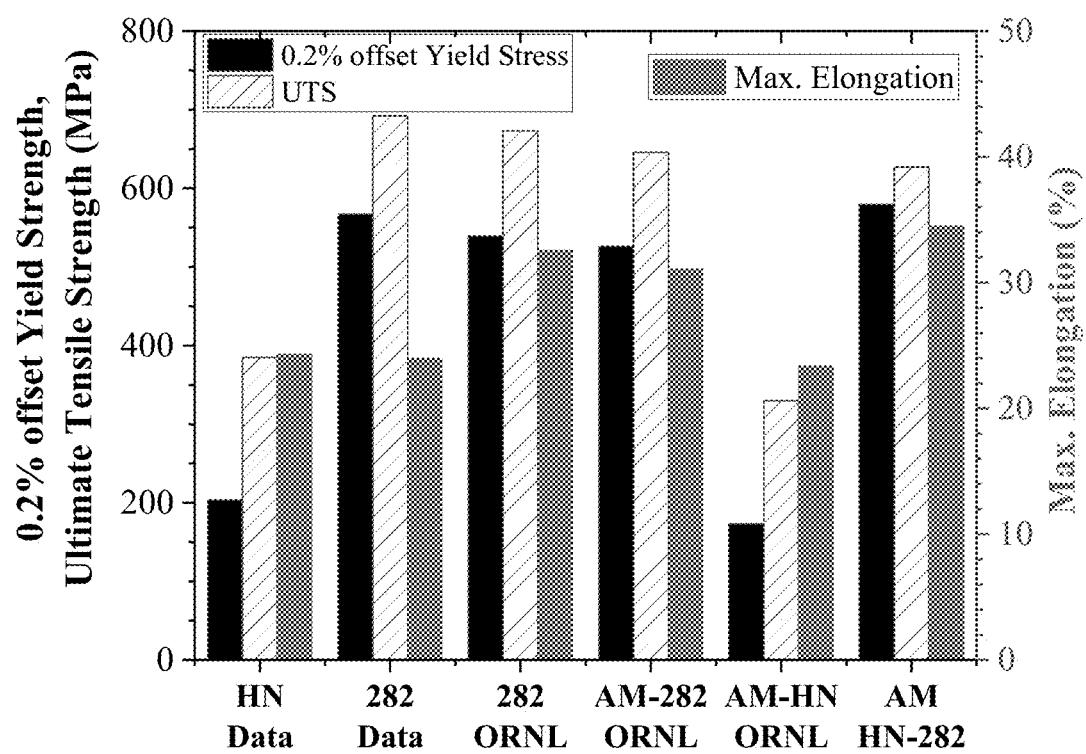
FIG. 7 is a plot of the measured tensile properties 0.2% offset Yield Strength, ultimate tensile strength (MPa), and maximum elongation (%) at 816° C. of dual UNS #N1003-UNS #N07208 (AMDUAL) material, compared to alloy manufacturer data for UNS #N1003 (UNS #N1003 Data) and UNS #N07208 (UNS #N07208 Data), baseline testing of UNS #N07208 (UNS #N07208 ORNL), additively manufactured UNS #N07208 (AM-UNS #N07208 ORNL), and additively manufactured UNS #N1003 (AM-UNS #N1003 ORNL).
Figure 8:
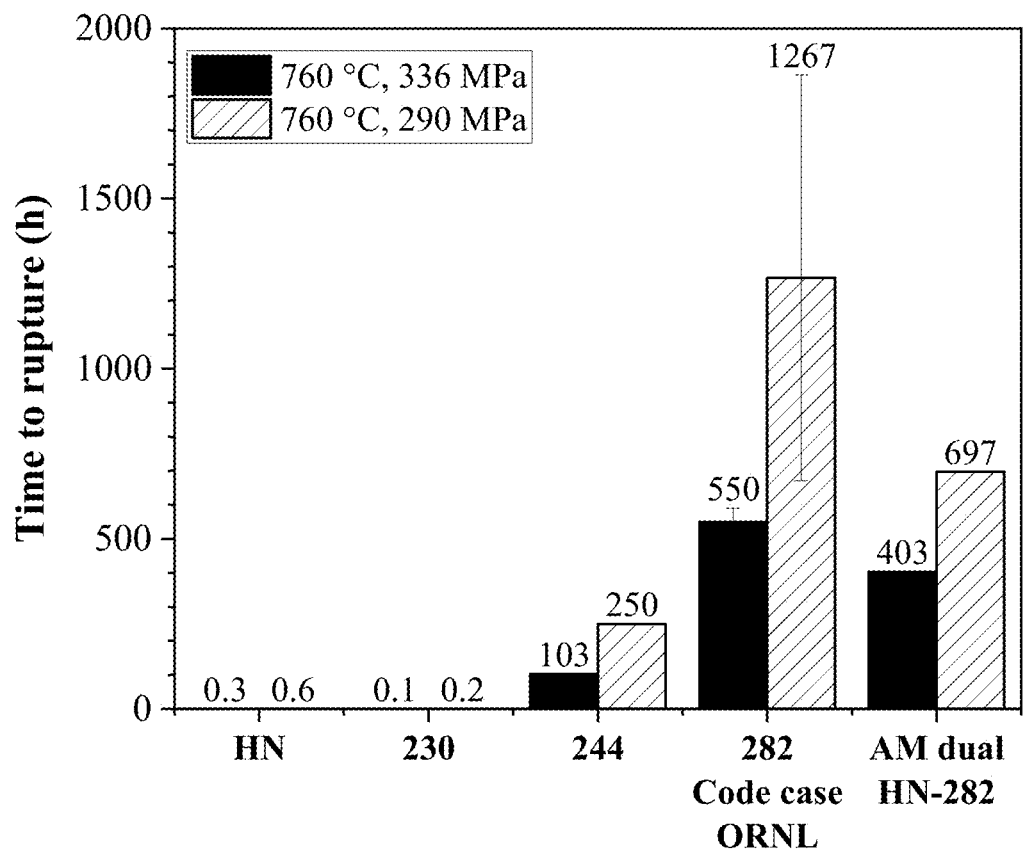
FIG. 8 is a creep rupture time (h) at 760° C. (336 and 290 MPa) for the additively manufactured dual UNS #N1003-UNS #N07208 material (AM DUAL) compared with state-of-the art alloys UNS #N1003, 230, 244 and UNS #N07208.

FIG. 7 shows that the elevated temperature tensile properties of the additively manufactured dual UNS #N1003-UNS #N07208 material are far superior to UNS #N1003 and comparable to UNS #N07208. FIG. 8 shows the Larson-Miller Parameter plot for different state of the art candidate materials such as UNS #N1003, Haynes 230 and UNS #N07208. The data for the additively manufactured dual UNS #N1003-UNS #N07208 material is plotted for comparison. The dual UNS #N1003-UNS #N07208 material is outperforming the candidate materials UNS #N1003, 230 and 240 while demonstrating comparable creep rupture life to UNS #N07208.

The invention combines physics-based thermokinetic modeling with additive manufacturing (directed energy deposition) to identify compatible materials that can be fabricated as a property-graded material to cater to application-specific needs. During the design process, the invention accounts for corrosion-induced degradation of the property-graded material by predicting the impact of corrosion on the performance of the material during service. This allows tuning of the compositional grading to mitigate corrosion-induced degradation and maximize performance. The invention permits the development of property-graded materials for heat exchangers with different corrosive environments on opposing surfaces (e.g., molten salts\supercritical $CO_2$ heat exchangers). Dual material UNS #N1003-UNS #N07208 is a dual corrosion-resistant material with resistance to molten halide salts on one side (UNS #N1003 side) of the wall and oxidizing conditions on the other side (UNS #N07208 side) of the wall. This alloy is a single unified material combining a solid solution strengthened UNS #N1003 and a precipitation (gamma prime) strengthened UNS #N07208.

The invention as shown in the drawings and described in detail herein disclose arrangements of elements of particular construction and configuration for illustrating preferred embodiments of structure and method of operation of the present invention. It is to be understood however, that elements of different construction and configuration and other arrangements thereof, other than those illustrated and described may be employed in accordance with the spirit of the invention, and such changes, alternations and modifications as would occur to those skilled in the art are considered to be within the scope of this invention as broadly defined in the appended claims. In addition, it is to be understood that the phraseology and terminology employed herein are for the purpose of description and should not be regarded as limiting.

We claim:

1. A wall construction for separating a low oxygen content corrosive environment from a high oxygen content oxidizing environment, comprising:
the wall having a wall thickness and a first surface segment for contacting the low oxygen content corrosive environment, and a second surface segment for contacting the high oxygen content oxidizing environment;
the wall comprising wall alloy having a total wall alloy composition comprising, in weight percent: 0 to 5 Al; 5 to 30 Cr; 0 to 20 Co; 0 to 70 Fe; 0 to 2 Nb; 0 to 2 Ta; 0 to 3 Ti; 0 to 1 Si; 0 to 1 V; 0 to 2 Mn; 0 to 5 Cu; 0 to 30 Mo; 0 to 30 W; 0 to 0.1 P; 0 to 1 Zr; 0 to 1 Hf; 0 to 0.1 Y; 0.05 to 0.5 C; 0 to 0.1 N; and balance Ni;
the alloy being compositionally graded from the first surface segment having a first surface segment alloy composition to the second surface segment having a second surface segment alloy composition;
the first surface segment alloy composition comprising, in weight percent based on the total weight of the alloy at the first surface segment, 5-15 Cr, 0-70 Fe, 0-5 Co, 0-30 Mo, 0-1 Mn, 0-0.5 Si, 0-0.1 C, and balance Ni;
the second surface segment alloy composition comprising, in weight percent based on the total weight of the alloy at the second surface segment, 15-30 Cr, 0-70 Fe, 0-20 Co, 0-30 Mo, 0-3 Ti, 0-5 Al, 0-0.5 C, and balance Ni;
the wall alloy having a stable FCC austenitic matrix microstructure, with strengthening phases comprising gamma prime with a volume fraction of 1 to 30% and carbides with a volume fraction of 0 to 5%, based on the total volume of the alloy;
the wall providing corrosion resistance to the liquid low oxygen content corrosive environment with O content between 0 to 20,000 ppm and to the high oxygen content oxidizing environment with O partial pressure between 10-20 to 1 bar, such that the depth of corrosion attack on each of the first and second surface segments after 10,000 h at 800° C. is no more than 10% of the wall thickness.

2. The wall construction of claim 1, wherein the fraction of the strengthening phases is at a maximum over at least 50% of the wall thickness.

3. The wall construction of claim 1, wherein the wall thickness between the first surface and the second surface is a minimum 2 mm.

4. The wall construction of claim 1, wherein the wall alloy is deposited by directed energy deposition, with a laser power between 200-2500 W.

5. The wall construction of claim 1, wherein the wall alloy is deposited by directed energy deposition, with a powder feed rate between 2-20 g/min.

6. The wall construction of claim 1, wherein the wall alloy is deposited by directed energy deposition, with a scan speed between 5-20 mm/s.

7. The wall construction of claim 1, wherein the wall alloy is deposited by directed energy deposition, with a hopper disk speed between 0.1 to 5 rpm.

8. The wall construction of claim 1, wherein the wall alloy is deposited by directed energy deposition, with a layer height between 0.2-2 mm.

9. A functionally graded alloy for separating a low oxygen content corrosive environment from a high oxygen content oxidizing environment, comprising:
a thickness and a first surface segment having a first surface segment alloy composition for contacting the low oxygen content corrosive environment, and a second surface segment having a second surface alloy composition for contacting the high oxygen content oxidizing environment;
the alloy comprising, in weight percent based on the total weight of the alloy: 0 to 5 Al; 5 to 30 Cr; 0 to 20 Co; 0 to 70 Fe; 0 to 2 Nb; 0 to 2 Ta; 0 to 3 Ti; 0 to 1 Si; 0 to 1 V; 0 to 2 Mn; 0 to 5 Cu; 0 to 30 Mo; 0 to 30 W; 0 to 0.1 P; 0 to 1 Zr; 0 to 1 Hf; 0 to 0.1 Y; 0.05 to 0.5 C; 0 to 0.1 N; and balance Ni;
the alloy being compositionally graded from the first surface segment to the second surface segment;
the first surface segment alloy composition comprising, in weight percent based on the total weight of the alloy at the first surface segment 5-15 Cr, 0-70 Fe, 0-5 Co, 0-30 Mo, 0-1 Mn, 0-0.5 Si, 0-0.1 C, balance Ni; and,
the second surface segment alloy composition comprising, in weight percent based on the total weight of the alloy at the second surface segment, 15-30 Cr, 0-70 Fe, 0-20 Co, 0-30 Mo, 0-3 Ti, 0-5 Al, 0-0.5 C, balance Ni.

10. The functionally graded alloy of claim 9, wherein the alloy has a stable FCC austenitic matrix microstructure, with strengthening phases comprising gamma prime with a volume fraction of 1 to 30% and carbides with a volume fraction of 0 to 5%, based on the total volume of the alloy.

11. A component for a molten salt reactor, the component comprising:
a wall construction for separating a low oxygen content corrosive environment from a high oxygen content oxidizing environment;
the wall having a wall thickness and a first surface segment having a first surface segment alloy composition for contacting the low oxygen content corrosive environment, and a second surface segment having a second surface alloy composition for contacting the high oxygen content oxidizing environment;
the wall comprising wall alloy having a total wall alloy composition comprising, in weight percent: 0 to 5 Al; 5 to 30 Cr; 0 to 20 Co; 0 to 70 Fe; 0 to 2 Nb; 0 to 2 Ta; 0 to 3 Ti; 0 to 1 Si; 0 to 1 V; 0 to 2 Mn; 0 to 5 Cu; 0 to 30 Mo; 0 to 30 W; 0 to 0.1 P; 0 to 1 Zr; 0 to 1 Hf; 0 to 0.1 Y; 0.05 to 0.5 C; 0 to 0.1 N; and balance Ni;
the alloy being compositionally graded from the first surface segment to the second surface segment;
the first surface segment alloy composition comprising, in weight percent based on the total weight of the alloy at the first surface segment, 5-15 Cr, 0-70 Fe, 0-5 Co, 0-30 Mo, 0-1 Mn, 0-0.5 Si, 0-0.1 C, balance Ni;
the second surface segment alloy composition comprising, in weight percent based on the total weight of the alloy at the second surface segment, 15-30 Cr, 0-70 Fe, 0-20 Co, 0-30 Mo, 0-3 Ti, 0-5 Al, 0-0.5 C, balance Ni;
the alloy having a stable FCC austenitic matrix microstructure, with strengthening phases comprising gamma prime with a volume fraction of 1 to 30% and carbides with a volume fraction of 0 to 5%, based on the total volume of the alloy; and,
the wall providing corrosion resistance to the liquid low oxygen content corrosive environment with O content between 0 to 20,000 ppm and to the high oxygen content oxidizing environment with O partial pressure between 10-20 to 1 bar, such that the depth of corrosion attack on each of the first and second surface segments after 10,000 h at 800° C. is no more than 10% of the wall thickness.

* * * * *